United States Patent
Hatime

(10) Patent No.: US 7,310,682 B2
(45) Date of Patent: Dec. 18, 2007

(54) SYSTEMS AND METHODS FOR IMPROVING NETWORK PERFORMANCE

(75) Inventor: Hicham Hatime, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 902 days.

(21) Appl. No.: 10/755,144

(22) Filed: Jan. 8, 2004

(65) Prior Publication Data

US 2005/0165948 A1 Jul. 28, 2005

(51) Int. Cl.
*G06F 15/16* (2006.01)
(52) U.S. Cl. ............... 709/233; 709/224; 709/234; 709/235
(58) Field of Classification Search ........... 709/224, 709/233, 235
See application file for complete search history.

(56) References Cited

U.S. PATENT DOCUMENTS

| | | | | |
|---|---|---|---|---|
| 5,627,970 A | * | 5/1997 | Keshav | 709/233 |
| 5,784,569 A | * | 7/1998 | Miller et al. | 709/235 |
| 5,848,266 A | * | 12/1998 | Scheurich | 713/503 |
| 6,105,064 A | * | 8/2000 | Davis et al. | 709/224 |
| 6,219,712 B1 | * | 4/2001 | Mann et al. | 709/235 |
| 6,308,214 B1 | * | 10/2001 | Plevyak et al. | 709/233 |
| 6,462,742 B1 | * | 10/2002 | Rose et al. | 345/473 |
| 6,505,253 B1 | * | 1/2003 | Chiu et al. | 709/235 |
| 2001/0010059 A1 | * | 7/2001 | Burman et al. | 709/224 |
| 2003/0023746 A1 | * | 1/2003 | Loguinov | 709/235 |
| 2003/0078930 A1 | * | 4/2003 | Surcouf et al. | 707/10 |

* cited by examiner

*Primary Examiner*—Michael Won
(74) *Attorney, Agent, or Firm*—Duft, Bornsen & Fishman

(57) ABSTRACT

Systems and methods for improving network throughput in a packet ties to network communication environment. In one aspect here of, delays associated with retransmission of a packet or reduced to improve total performance and bandwidth utilization on the communication network medium. A roundtrip time parameter of TCP/IP communications networks may be adjusted according to actual measured response time of a successful packet transmission and used as a timeout value to detect a possible packet loss sooner than previous techniques. Another aspect hereof provides for dynamically adjusting estimated available bandwidth of the communication medium. The estimated available bandwidth is then useful to better avoid congestion on the medium and the resulting packet loss.

6 Claims, 3 Drawing Sheets

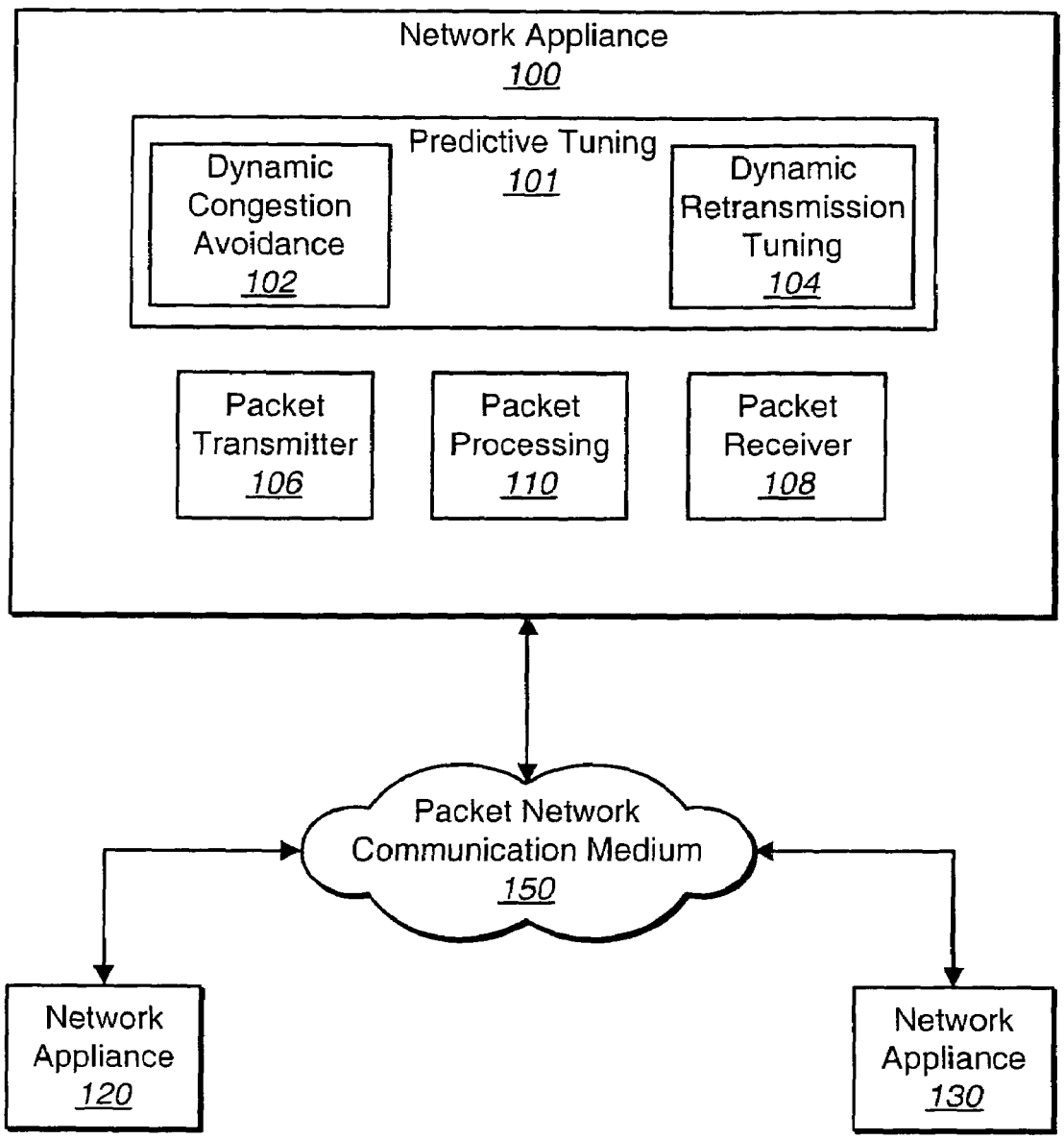
FIG._1

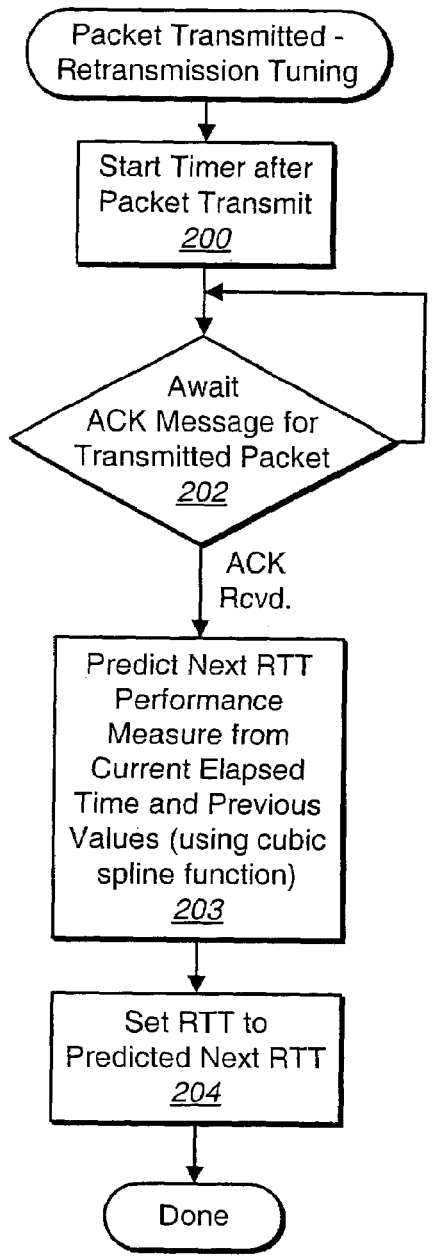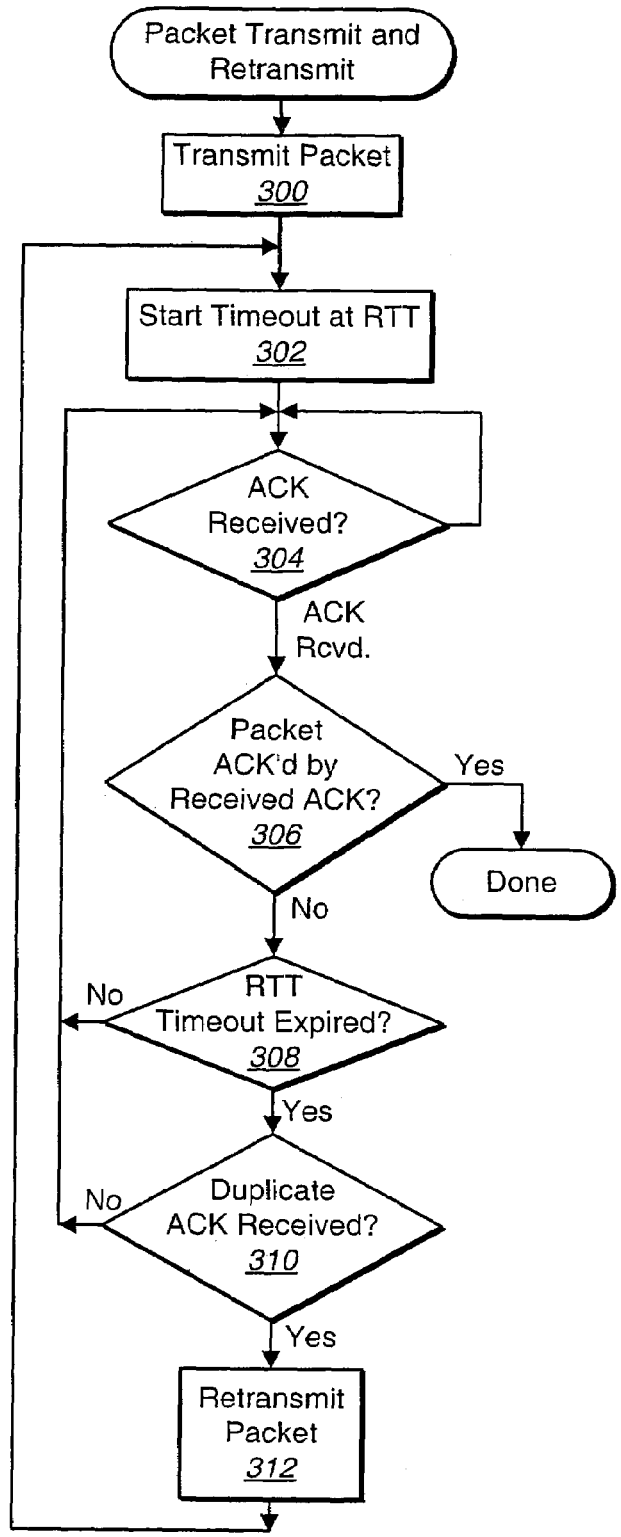
FIG._2
FIG._3

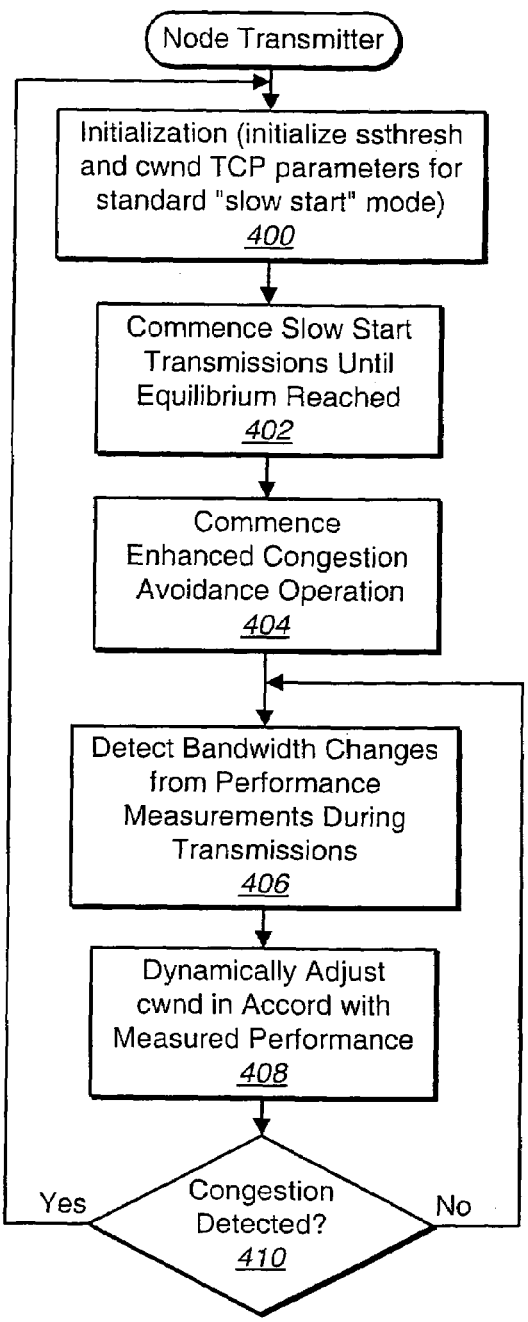
FIG._4
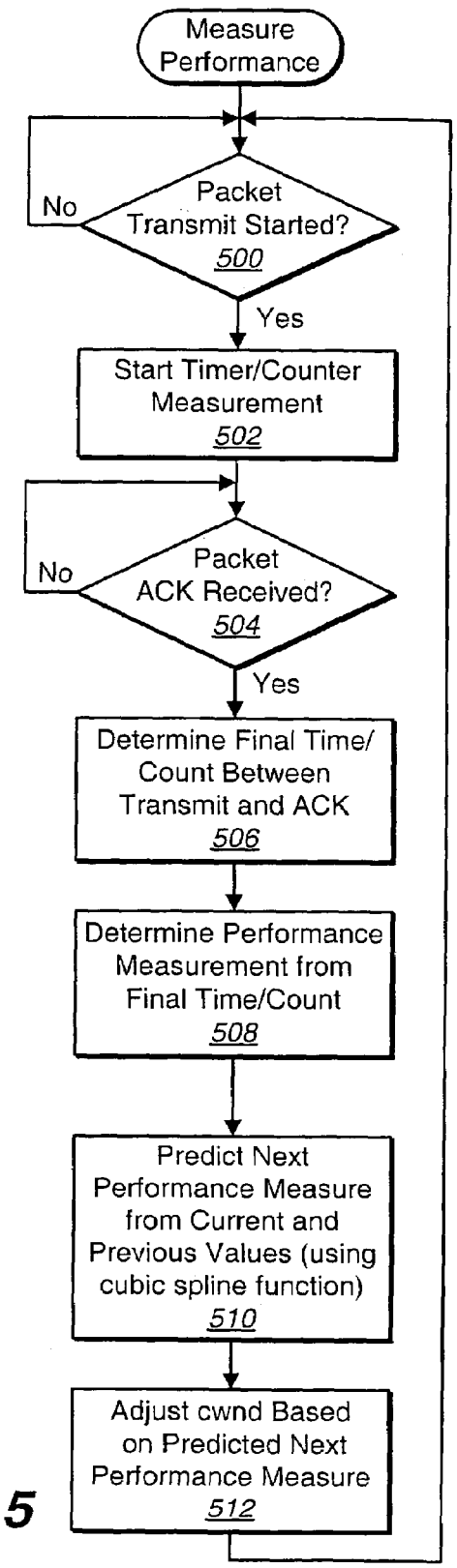
FIG._5

SYSTEMS AND METHODS FOR IMPROVING NETWORK PERFORMANCE

BACKGROUND OF THE INVENTION

1. Field of the Invention

The present application relates to computer/communication networking and in particular relates to improved methods for detecting and avoiding network congestion and for reducing retransmission latencies in packetized protocols applied to network communications.

2. Discussion of Related Art

Many present day communication networks exchange packets of information between nodes coupled to a common communication medium. The nodes may be, for example, computing devices, storage devices for storing information, or other communication or network appliances for generating, receiving, storing, forwarding or routing the packets of information. The communication medium may be widely distributed as in a so-called wide area network ("WAN") or localized within an enterprise as in a so-called local are network ("LAN"). The information be exchanged between nodes is generally subdivided into one or more packets. Each packet may include some subset of the total information to be exchanged between nodes over the network. Packets may be fixed or variable in size in accordance with the particular protocols and communication media employed. Further, each packet may represent a unit of information to be verified and acknowledged between the nodes in accordance with the particular protocols and media employed.

For example, in TCP/IP protocols applied to Ethernet communication media, information is subdivided into one or more packets of variable sizes less than a pre-determined maximum size. Packets are initially transmitted in a sequential order corresponding to the order of the information to be exchanged. Individual packets are each identified by a sequence ID field to indicate their proper order relative to one another. The receiving node(s) may then reassemble the received packets into the originally transmitted information.

In TCP/IP networks and other packetized networks, packets may be lost in transmission for various reasons. For example, a noisy communication medium (one having a low signal to noise ratio) may cause errors in the transmitted packets. Another reason for packet loss is congestion on the communication medium. Ethernet and other communication media allow devices to communicate over multiple segments of communication links through one or more intermediate nodes or devices. Where the multiple links vary in speed or where the intermediate device(s) are of variable processing capability, a sequence of packets transmitted from a sender to a receiver may cause congestions. Packets moving from a faster network segment or node to a slower segment may over-run the available bandwidth of the slower link or node. If the intermediate node detects such congestion it may discard received packets from its internal queues. Such congestion may be more common where multiple transmitters attempt to forward packets through a common segment or node. However, even a single node may generate and transmit packets so quickly that it may, alone, utilize all available bandwidth. Such saturation of the communication medium can cause packet loss if the receiving intermediate node(s) or segment(s) cannot process the received packets quickly enough.

When packets are lost, TCP/IP and other common protocols may cause retransmission of packets that were lost and all subsequent packets from that point forward (in the sequence of transmitted packets). Such retransmissions are costly in terms of elapsed time to complete the desired transmission and in terms of bandwidth utilization since information (packets) previously transmitted must be transmitted again. In some presently known protocols (such as the so-called Reno version of TCP/IP), the sender determines that a packet has been missed by the receiving node when the sending node receive three consecutive acknowledgement messages (i.e., TCP/IP ACK messages) each indicating a duplicate sequence ID value.

To avoid such costly packet loss and the associated retransmissions, present TCP/IP (and other) protocols use techniques to attempt to estimate the available bandwidth on the communication medium and then to use the estimated available bandwidth to limit the transmitting node in hopes of thereby avoiding congestion and the resulting packet loss and performance degradation. Presently known techniques, such as those practiced in the present-day Reno version of the TCP/IP protocols ("Reno TCP/IP"), attempt to avoid congestion by predicting the available bandwidth of the communication medium and then limiting the transmitting node to a fixed percentage thereof. RFC2581 provides specifications for the TCP/IP protocol for presently known techniques to reduce congestion packet loss and the associated packet retransmission. RFC2581 and other related TCP/IP specifications are readily available to those of ordinary skill in the art and may be found, for example, at http://www.rfc-editor.org/rfc.html. However, these presently practiced techniques predict the available bandwidth using essentially static information regarding the communication medium at a fixed point in time. Further, present techniques, such as those in Reno TCP/IP, often intentionally generate packet loss conditions in order to determine the available bandwidth on the communication medium.

It is therefore an ongoing challenge to detect and avoid congestion on a communication network. It is a further ongoing challenge to reduce the time required to detect a lost packet and to retransmit any necessary packets in response to such detection.

SUMMARY OF THE INVENTION

The present invention solves the above and other problems, thereby advancing the state of the useful arts, by providing improved methods and structures for detecting and avoiding network congestion and for detecting and retransmitting lost packets when required. In one aspect hereof, the available bandwidth is estimated dynamically by features hereof that continually learn the available bandwidth of the network medium based on mathematical analysis of one or more past responses from the receiving node(s). Another aspect hereof uses a curve fitting mathematical analysis of prior responses from the receiving node to permit interpolation/extrapolation techniques to predict an estimated future response. Still other aspects hereof improve the speed of detecting loss of a packet by improving the accuracy of round-trip time ("RTT") estimates. The RTT is estimated based on measurements of the actual time to respond from previous acknowledged packet transmissions.

A feature hereof therefore provides a method of reducing network congestion comprising the steps of: transmitting multiple packets from a sending node to a receiving node over a network communication medium at a rate no faster than a predetermined maximum packet transmission rate value; receiving multiple acknowledgements at the sending node from the receiving node; measuring a transmission performance value based on transmission of a packet of the multiple packets and a corresponding acknowledgment of the multiple acknowledgements; predicting an available bandwidth value based on at least two transmission performance values; and adjusting the predetermined maximum packet transmission rate based on the predicted available bandwidth to reduce network congestion on the network communication medium.

Another feature hereof provides a method for reducing re-transmission delays in a packetized network protocol comprising: measuring a time between a successful packet transmission and receipt of a corresponding acknowledgement; using the measured time as a timeout value for a subsequent packet transmission; detecting expiration of the timeout value following the transmission of the subsequent packet; and retransmitting the subsequent packet in response to detecting expiration of the timeout value.

Another feature hereof provides a system comprising: a packet network communication medium; a first network appliance communicatively coupled to the medium; and one or more other network appliances communicatively coupled to the first network appliance via the medium, such that the first network appliance further comprises: a predictive tuning element to dynamically predictively adapt protocol parameters of the first network appliance based on present and past measurements of throughput on the medium.

BRIEF DESCRIPTION OF THE DRAWINGS

FIG. 1 is a block diagram of an exemplary network appliance enhanced in accordance with features and aspects hereof.

FIG. 2 is a flowchart describing an exemplary method for tuning retransmission parameters in accordance with features and aspects hereof.

FIG. 3 is a flowchart describing an exemplary method for applying dynamically tuned retransmission parameters in accordance with features and aspects hereof.

FIG. 4 is a flowchart describing an exemplary method for operating a TCP transmitter in accordance with features and aspects hereof.

FIG. 5 is a flowchart describing an exemplary method for dynamically adjusting TCP/IP parameters used by the exemplary transmitter of FIG. 5 to reduce network congestion.

DETAILED DESCRIPTION OF THE DRAWINGS

FIG. 1 is a block diagram depicting an enhanced network appliance 100 coupled to two other network appliances 120 and 130 via packet network communication medium 150. Packet network communication medium 150 may be any appropriate packet switched network communication medium and protocol appropriate for the particular application. For example, medium 150 maybe a TCP/IP network protocol applied to an Ethernet communication medium. Network appliance 100 maybe any node or computing device adapted for coupling to such a packet network communication medium 150. For example, network appliance 100 may be a personal computer or workstation or any network appliance including bridges, routers, hubs, etc.

Network appliance 100 includes packet transmitter element 106 and packet receiver element 108 for transmitting and receiving packets, respectively, via media 150. Packet processing element 110 generates packets to be transmitted via packet transmitter 106 and reconstructs buffers of data from received packets received via packet receiver element 108.

In accordance with features and aspects hereof, network appliance 100 may also include dynamic congestion avoidance element 102 and dynamic retransmission tuning element 104 to improve network communications capabilities of network appliance 100 (collectively or individually also referred to herein as a predictive tuning element 101). Dynamic retransmission tuning element 104 is generally operable to adjust parameters of the packet transmission protocol to reduce latencies associated with retransmission of a failed or lost packet. Dynamic congestion avoidance element 102 also tunes parameters of the packet protocol to reduce the possibility of congestion generated by network appliance 100 on the communication medium 150. By reducing the possibility of such congestion on the communication medium 150, enhanced network appliance 100 improves overall system performance by reducing the number of occurrences of lost packets and associated, time consuming, packet retransmissions. In addition, by dynamically tuning the retransmission related protocol parameters, latencies associated with the occasional need for retransmission may be reduced thereby further improving overall system performance.

FIG. 2 is a flowchart describing an exemplary method associated with features and aspects hereof operable to dynamically tune protocol parameters to reduce the latencies associated with packet retransmission. As applied to TCP/IP protocols, the exemplary method is adapted to measure the time between transmission of a packet and receipt of a corresponding acknowledgement message ("ACK") for the transmitted packet. The round trip time TCP/IP parameter ("RTT") is then set to the measured elapsed time between packet transmission and receipt of a corresponding acknowledgement. More specifically, element 200 is operable to start a timer following detection of a packet transmission by transmitting elements of the associated network appliance. Element 202 then loops, awaiting detection of the ACK message corresponding to the transmitted packet.

Upon receipt of the corresponding ACK message, element 203 is operable to estimate the next RTT value based on the elapsed time between the packet transmission and the corresponding ACK receipt. The next RTT value may be predicted as a function of the current throughput value (computed from the measured time interval) and previous measured values. As discussed further herein below, a cubic spline function may be used such that the next RTT value may be extrapolated from the current RTT estimated value and one or more past measured values. Using the predicted next RTT value so determined, element 204 next sets RTT to the predicted next value. The method of FIG. 2 thus may dynamically adjust the RTT TCP/IP parameter value according to measured and extrapolated throughput values. The method of FIG. 2 may be operable to dynamically adjust RTT in response to every packet transmission (and receipt of a corresponding ACK). Alternatively, the method that may be operable periodically in response to transmission of selected packets (and receipt of corresponding ACKs).

While prior techniques used a coarse timer value to conservatively overestimate the round trip time of packet exchange, features and aspects hereof more accurately estimate RTT based on current and past actual measurements of elapsed times between packet transmission and receipt of a corresponding ACK message. Such dynamically adjust RTT values using improved accuracy in the estimation of the actual throughput enhances the time required for detection of the need to retransmit a packet.

FIG. 3 is a flowchart describing exemplary enhanced operation of a network appliance to utilize the dynamically tuned retransmission parameters to reduce the latencies associated with lost packet retransmission. Element 300 is first operable to initiate transmission of a packet. Element 302 then starts a timer with the RTT timeout value most recently determined. Element 304 determines whether any ACK message has been received. When any ACK message is received, element 306 is operable to determine whether the ACK message acknowledges the packet transmitted at element 300. If so, transmission of the packet is successful and the method completes normally. If the received ACK does not acknowledge the transmitted packet, element 308 is next operable to determine whether the RTT timeout period has expired. If not, the method continues looping back to element 304 to await receipt of yet another acknowledgement message. If element 308 determines that the RTT timeout period has expired, element 310 determines whether the received acknowledgement message is a duplicate acknowledgement message (i.e., duplicating a preceding received acknowledgement message).

If the acknowledgement message is not a duplicate ACK, processing continues looping back to the element 304 to await receipt of another acknowledgement message. If element 310 determines that the received ACK is a duplicate ACK, indicating likely loss of a transmitted packet, element 312 is then operable to commence retransmission processing.

By comparison with presently practiced retransmission techniques, features and aspects hereof reduce the delay in determining that a retransmission must occur. Where prior techniques (as documented in, for example, RFC2581) awaited receipt of three duplicate ACK messages, features and aspects hereof my detect the need to transmit by waiting for two duplicate ACK messages and the expiration of the RTT timeout period. Since the RTT timeout period is dynamically adjusted by features and aspects hereof, the timeout may be tuned to an optimal or near optimal value. Thus, features and aspects hereof may notably reduce the time required to detect the need for a retransmission of a previously sent packet.

FIG. 4 is a flowchart describing operation of a transmitter element of a network appliance enhanced with features and aspects hereof to reduce network congestion. Element 400 is operable to initialize transmission related parameters of the packet protocol. For example, as applied to TCP/IP protocol exchanges, "ssthresh" (slow start threshold) and "cwnd" (congestion window) are initialized according to the standards of the "slow start" mode of TCP/IP protocol specifications (such as in RFC2581). Element 402 then commences transmission operation using the slow start TCP IP mode until an appropriate equilibrium state is achieved (i.e., when cwnd first exceeds ssthresh in accordance with RFC2581). When slow start transmission mode finely achieves an appropriate equilibrium, element 404 is operable to commence normal transmit operation in accordance with enhanced congestion avoidance features and aspects hereof. In general, previously known techniques achieve an equilibrium status and then, when a packet loss is detected and a corresponding retransmission initiated, reverts again to slow start mode. By contrast, features and aspects hereof enhance congestion avoidance techniques by dynamically measuring actual throughput performance on the network medium and predicting future performance therefrom. The predicted future performance may then be used to periodically and dynamically adjust the cwnd congestion avoidance TCP/IP parameter to reduce the possibility of congestion on the network medium.

In particular, during enhanced congestion avoidance operation mode initiated by element 404, elements 406 and 408 are operable to detect bandwidth changes from performance measurements made during normal packet transmission to the network medium and to dynamically adjust cwnd in accordance with those measured parameters. Element 410 then determines whether congestion has been detected on the network as reflected by a lost packet and the need for a corresponding packet retransmission. If no such congestion and corresponding retransmission is detected, processing continues in the enhanced congestion avoidance mode of operation. Elements 406 and 408 continue to dynamically measure network performance and adjust congestion detection related parameters of the TCP/IP transmitter. If congestion is detected by element 410 as reflected in packet loss and corresponding retransmission, processing continues by looping back to element 402 to reinitialize the TCP/IP transmitter of the enhanced appliance and to restart transmission using the "slow start" mode of operation specified by TCP/IP protocol standards.

In view of the improved accuracy in estimating the available bandwidth for transmission throughput, the method of FIG. 4 will rarely encounter congestion by operation of element 410. In other words, the method of FIG. 4 improves congestion avoidance such that congestion occurs less frequently and hence is rarely detected. The iterative operation of elements 406, 408 and 410 therefore predominate the operation of the node transmitter as regards adjustment to and monitoring of throughput and associated congestion avoidance. By contrast, prior techniques adapted to changes in throughput very slowly or not at all. Cwnd parameter values would change very slowly or even remain static in accordance with prior techniques. In general, prior techniques simply started over with the slow start techniques when congestion was detected (by packet loss).

FIG. 5 is a flow chart describing an exemplary performance measurement method in accordance with features and aspects hereof. In general, performance is measured by counting events or timing events relating to aspects of the communication medium operation between transmission of a packet and receipt of a corresponding acknowledgement message for the transmitted packet. In general, a packet pair algorithm may be applied to this measurement. In general, the packet pair algorithm relies on the presumption that if two packets to be transmitted are queued next to one another in a queue at a link/node representing the performance bottleneck in communications, the two packets will exit that link in a predictable manner. The time between the two packet transmissions is computable in accordance with the measured performance of the bottleneck link and the known packet size. Specifically, the bandwidth of the bottleneck link (Bbln) between two nodes can be measured as:

$$Bbln = S/(t2 - t1)$$

Where S is the packet size and t1 and t2 are the absolute times of arrival of two acknowledgement messages: t1 corresponding to the arrival of the ACK for the first packet and t2 corresponding to the arrival of the ACK for the second packet.

Alternatively, bandwidth may be measured by counting the number of packets of equal size transmitted before receiving an acknowledgement for a first of a sequence of such packets.

Having so computed the Bbln from the time difference between arrival of two acknowledgement messages or from the count of the number of packets sent before receiving an acknowledgement for a particular transmitted packet, the future performance of the communication medium may be extrapolated from this current performance measurement and past measurements. The next cwnd parameter value may then be computed as the previous value plus or minus any incremental value. The incremental value may be determined as the minimum of a value computed from the predicted next throughput value and a value determined by exponential or linear increases dictated by the slow start standard congestion avoidance techniques. More specifically, the cwnd may be dynamically, periodically adjusted as:

next_cwnd=prev_cwnd+min(((predicted_throughput−previous_throughput)/segment_size), (exponential or linear increase depending on proximity to ssthresh))

In other words, if the current throughput is near the ssthresh TPC/IP parameter value (slow start threshold), then the congestion window (cwnd TCP/IP parameter value) is adjusted by the lesser of the next predicted throughput value and the linear increase value as normally utilized in slow start processing. If the current throughput is far from ssthresh, then cwnd is adjusted by the lesser of the next predicted throughput value and the exponential increase value as normally utilized in congestion avoidance processing. This aspect hereof helps adjust the congestion window (cwnd) to adapt to the actual, present throughput while adjusting more rapidly or more slowly to adhere to present TCP/IP slow start processing standards. As noted above, the RTT TCP/IP parameter could be similarly adapted based on current and previous throughput measurements and extrapolated values.

Returning to FIG. 5, element 500 is operable to await detection of a packet transmission by the packet transmitter element described above. Upon detection of transmission of a packet, element 502 is next operable to start an appropriate timer or counter to measure the desired performance parameter. As noted above, performance may be measured in accordance with the time between receipt of consecutive acknowledgement messages or as a function of the number of packets transmitted between the transmission of a first packet and receipt of the acknowledgement corresponding to that first packet. The timer or counter then continues while element 504 awaits detection of an appropriate acknowledgement message. Upon such detection, element 506 then determines the final time or count value as measured from the start of the measurement at element 502 until detection of the relevant acknowledgement message at element 504. Element 508 then determines an appropriate performance measurement from the final time work and value measured by element 506. Element 510 is operable to predict the next performance measure from the current and previous performance measurement values. In one exemplary embodiment hereof, a cubic spline function may be applied to predict a next performance value from current and previous performance and values as follows:

The cubic spline extrapolation is based on fitting a cubic function curve through all the points of a given set. Given a function $Y_i=f(X_i)$, $i=1 \ldots N$, and given an interval $[X_i, X_{i+1}]$, the cubic function is given by the formula:

$$Y=AY_i+BY_{i+1}+CY''_i+DY''_{i+1}$$

Where $A=(X_{i+1}-X)/(X_{i+1}-X_i)$
$B=(X-X_i)/(X_{i+1}-X_i)$
$C=\frac{1}{6}(A^3-A)(X_{i+1}-X_i)^2$
$D=\frac{1}{6}(B^3-B)(X_{i+1}-X_i)^2$ And the second derivatives Y" of the curve are given by:

$$((X_i-X_{i-1})*Y''_{i-1})/6+((X_{i+1}-X_{i-1})*Y''_i)/3+((X_{i+1}-X_i)*Y''_{i+1})/6=(Y_{i+1}-Y_i)/(X_{i+1}-X_i)-(Y_i-Y_{i-1})/(X_i-X_{i-1})$$

after deriving the value of the function, it can be used to determine the value of any point within or outside the interval.

Element 512 is then operable to adjust the TCP/IP transmitter's cwnd parameter based on the predicted next performance measurement. Processing then continues looping back to element 500 to await a next packet transmission. The method of FIG. 5 may be operable to dynamically adjust cwnd in response to every packet transmission. Alternatively, the method that may be operable periodically in response to transmission of selected packets.

By so periodically measuring and adjusting performance related values of the TCP/IP transmitter, the sending node may reduce potential for congestion on the network medium and thereby improve overall system performance by reducing potential for packet loss and associated retransmission.

Those of ordinary skill in the art will readily recognize numerous functionally equivalent techniques for providing the desired dynamic adjustment to packet protocol transmission parameters to reduce potential for packet loss due to congestion and to reduce the latencies associated with packet retransmission when required. The particular exemplary methods and functions depicted herein may be implemented as one or more threads in a multithreaded or event driven programming paradigm. Such design choices are well known to those of ordinary skill in the art. Further, the methods and features and aspects described herein may be implemented in suitably programmed instructions for programmable devices as well as customized application specific integrated circuitry. Equivalency of such hardware, firmware and software designs and the performance and cost related tradeoffs associated with each represent well known design choices to those of ordinary skill in the art.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. A method of reducing network congestion comprising the steps of:

transmitting multiple packets from a sending node to a receiving node over a network communication medium at a rate no faster than a predetermined maximum packet transmission rate value;

receiving multiple acknowledgements at the sending node from the receiving node;

measuring a transmission performance value based on transmission of a packet of said multiple packets and a corresponding acknowledgment of the multiple acknowledgements;

predicting an available bandwidth value based on at least two transmission performance values, wherein the step of predicting comprises:

determining a polynomial equation based upon the at least two transmission performance values wherein the step of determining comprises determining a cubic spline function based upon the at least two transmission performance values; and extrapolating from the polynomial equation to determine the predicted available bandwidth value; and adjusting the predetermined maximum packet transmission rate based on the predicted available bandwidth to reduce network congestion on the network communication medium.

2. The method of claim 1 wherein the step of measuring comprises:

determining a time interval between a first transmitted packet and receipt of a corresponding acknowledgement message as the transmission performance value.

3. The method of claim 1 wherein the step of measuring comprises:

counting a number of additional packets transmitted between a first transmitted packet and receipt of a corresponding acknowledgement message as the transmission performance value.

4. A computer readable storage medium tangibly embodying program instructions to perform a method of reducing network congestion, the method comprising the steps of:

transmitting multiple packets from a sending node to a receiving node over a network communication medium at a rate no faster than a predetermined maximum packet transmission rate value;

receiving multiple acknowledgements at the sending node from the receiving node;

measuring a transmission performance value based on transmission of a packet of said multiple packets and a corresponding acknowledgment of the multiple acknowledgements;

predicting an available bandwidth value based on at least two transmission performance values, wherein the step of predicting comprises:

determining a polynomial equation based upon the at least two transmission performance values wherein the step of determining comprises determining a cubic spline function based upon the at least two transmission performance values; and extrapolating from the polynomial equation to determine the predicted available bandwidth value; and adjusting the predetermined maximum packet transmission rate based on the predicted available bandwidth to reduce network congestion on the network communication medium.

5. The storage medium of claim 4 wherein the step of measuring comprises:

determining a time interval between a first transmitted packet and receipt of a corresponding acknowledgement message as the transmission performance value.

6. The storage medium of claim 4 wherein the step of measuring comprises:

counting a number of additional packets transmitted between a first transmitted packet and receipt of a corresponding acknowledgement message as the transmission performance value.

* * * * *